United States Patent
Uhlir-Tsang et al.

(10) Patent No.: US 7,052,535 B2
(45) Date of Patent: May 30, 2006

(54) ADDITIVES TO ELIMINATE BRONZING OF INKJET INK FORMULATIONS ON SPECIALTY QUICK-DRY INKJET PHOTOGRAPHIC MEDIA

(75) Inventors: Linda C. Uhlir-Tsang, Corvallis, OR (US); John R Moffatt, Corvallis, OR (US); Mary E Austin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 275 days.

(21) Appl. No.: 10/628,903

(22) Filed: Jul. 28, 2003

(65) Prior Publication Data

US 2005/0025914 A1 Feb. 3, 2005

(51) Int. Cl.
  *C09D 11/02* (2006.01)
  *B41M 5/00* (2006.01)

(52) U.S. Cl. .............................. 106/31.27; 106/31.43; 106/31.47; 106/31.58; 106/31.6; 106/31.75; 106/31.77; 106/31.86; 428/32.15; 428/32.34

(58) Field of Classification Search ............. 106/31.27, 106/31.6, 31.43, 31.75, 31.58, 31.86, 31.47, 106/31.77; 428/32.15, 32.34
See application file for complete search history.

(56) References Cited

U.S. PATENT DOCUMENTS

| | | | |
|---|---|---|---|
| 5,062,893 A | | 11/1991 | Adamic et al. |
| 5,198,022 A | | 3/1993 | Aulick et al. |
| 5,275,867 A | | 1/1994 | Misuda et al. |
| 5,463,178 A | | 10/1995 | Suzuki et al. |
| 5,605,750 A | | 2/1997 | Romano et al. |
| 5,766,327 A | * | 6/1998 | Maze ...................... 106/31.58 |
| 5,980,623 A | * | 11/1999 | Hiraoka et al. .......... 106/31.49 |
| 5,989,378 A | | 11/1999 | Liu et al. |
| 6,149,722 A | | 11/2000 | Robertson et al. |
| 6,187,430 B1 | | 2/2001 | Mukoyoshi et al. |
| 6,231,653 B1 | | 5/2001 | Lavery et al. |
| 6,319,309 B1 | | 11/2001 | Lavery et al. |
| 2004/0003755 A1 | | 1/2004 | Fukumoto et al. |
| 2005/0025915 A1 | * | 2/2005 | Uhlir-Tsang et al. .... 428/32.34 |
| 2005/0142306 A1 | * | 6/2005 | Uhlir-Tsang et al. .... 428/32.34 |

FOREIGN PATENT DOCUMENTS

| | | |
|---|---|---|
| EP | 0 823 463 A1 | 2/1998 |
| EP | 1 157 847 A1 | 11/2001 |
| EP | 1 219 457 A1 | 7/2002 |

* cited by examiner

*Primary Examiner*—Helene Klemanski

(57) ABSTRACT

Anti-bronzing compounds are added to inkjet inks to prevent bronzing of the inks when printed on specialty quick-dry inkjet photographic media. These compounds inhibit bronzing by the proper buffering of the dyes relative to the media of interest.

21 Claims, No Drawings

ADDITIVES TO ELIMINATE BRONZING OF INKJET INK FORMULATIONS ON SPECIALTY QUICK-DRY INKJET PHOTOGRAPHIC MEDIA

TECHNICAL FIELD

The present invention is directed to inkjet inks used in printing, and, more particularly, to improved inkjet inks in which bronzing has been reduced or even eliminated.

BACKGROUND ART

Bronzing is a lustrous sheen of a printed sample in reflected light which can be associated with only certain dyes. Specifically, bronzing refers to a reddish-brown color of the ink upon drying. It is particularly an undesirable property of black inks because of lowered optical densities produced. However, it also can affect other colors, cyan producing a reddish tone, for example. Bronzing is an undesirable print quality issue for the customer and prevents color attributes from being measured.

One solution proposed is to raise the pH of the ink. However, it has been found that a pH increase of the ink is liable to cause materials degradation in the printhead by the ink.

Thus, a means of reducing, or, preferably, even eliminating, bronzing of inkjet inks printed on print media is needed.

DISCLOSURE OF INVENTION

In accordance with the embodiments disclosed herein, compounds, called "anti-bronzing compounds" herein, are added to the ink to prevent bronzing when the ink is printed on a print media. At least one anti-bronzing additive having a pKa that is above the pH of the print media and less than the pH of the ink is added to the ink. Both ink composition and method of reducing bronzing in the inkjet ink are provided, as well as a combination of the ink composition and a print media having an alumina-based or silica-based coating as the ink-receiving layer.

The teachings herein permit reduction to acceptable levels, or even elimination, of bronzing of inkjet inks on print media. The advantages of the teachings herein over increasing the pH of the ink are that pH-sensitive materials in the printhead are not jeopardized and that there is a wide range of compounds that can be utilized in practice of the embodiments.

BEST MODES FOR CARRYING OUT THE INVENTION

Reference is made now in detail to specific embodiments, which illustrates the best mode presently contemplated by the inventors for practicing the invention. Alternative embodiments are also briefly described as applicable.

In accordance with the teachings herein, certain compounds are added to an inkjet ink to prevent, or at least reduce, bronzing of the ink when printed on a print media. The embodiments herein involve the addition of one or more compounds ("anti-bronzing compounds") having a pKa (experimentally determined) above the pH of the print media and below the pH of the inkjet ink. Preferably, the pKa of the anti-bronzing additive is at least 0.5 pH unit above the pH of the print media.

The inkjet ink must also have a pH above the highest applicable pKa of the dye.

The anti-bronzing compounds in the inkjet ink, upon being jetted onto an acidic print media, will raise the pH of the print media in the vicinity of the dye, thereby preventing bronzing relative to ineffective compounds that still permit bronzing. Without subscribing to any particular theory, it appears that the presence of the anti-bronzing additive serves to prevent the print media from protonating the dye. Examples of such anti-bronzing additive compounds include: 3-pyridylcarbinol, triethanolamine, N-methyldiethanolamine, N-phenyldiethanolamine, (tris)hydroxymethylaminomethane, and 1-hydroxyethylene-1,1-diphosphonic acid.

The anti-bronzing additive(s) to the ink and the concentration necessary to prevent bronzing depend upon: the concentration of dye in the inkjet ink that is printed, the pKa of the additive, and the pH of the print media on which the ink is printed.

There also appears to be a dependency on the pKa of the dye used in the ink. For example, an experimental phthalocyanine dye has a pKa of approximately 4. Adding a compound such as triethanolamine (aqueous pKa 7.77) at 10% to an ink eliminates bronzing on an experimental print media with a pH of 4 when the ink is adjusted to pH 8 to 8.5. On the other hand, adding diethanolamine (aqueous pKa 8.88) does not affect bronzing in the ink at pH 8 to 8.5, likely due to the fact that the ratio of the protonated to deprotonated diethanolamine is much greater than 1 in the ink (i.e., the effective concentration of anti-bronzing agent is lower) and cannot significantly raise the pH of the local media environment (see Table I, below). Thus, the pKa of the anti-bronzing additive may also need to be above that of the dye. On the other hand, due to equilibrium considerations, the pKa of the additive can be lower than the pKa of the dye if the concentration of the additive is high enough. Accordingly, the minimum pKa of the anti-bronzing additive is 1 unit below the experimentally determined applicable pKa of the dye.

Finally, there appears to be a dependency of ink bronzing on the nature of the print media. For example, many dyes that do not evidence bronzing on plain paper are found to evidence bronzing on other types of print media, for example, photopaper comprising a photobase substrate, a quick-drying ink-receiving layer thereon comprising an inorganic pigment (e.g., silica or alumina) and binder, and an optional topcoat. Further, dyes that evidence bronzing on some plain papers do not evidence bronzing on other plain papers. For example, on plain paper, highly depending on dye load, Acid Red 52 dye (AR52; CI 54100) and Food Black 2 dye (FB2; CI 27755) both bronze on Gilbert Bond, Hammermill Fore DP, etc. On the other hand, no bronzing is seen for AR52 or FB2 on Champion Data Copy.

The media pH has the lowest value, the additive pKa is higher than the media pH, the dye pKa is higher than minimum value of the additive pKa, and the ink pH has the highest value, with the value of the additive pKa ranging from above the media pH to below the ink pH.

Table I lists a number of additives, their pKa values and whether they cause bronzing. The ink tested comprised a copper phthalocyanine dye (see U.S. Pat. No. 6,149,722, formula 1, where R1=$C_2H_4OH$, R2=H, x=2.7, y=0.5, z=0.8), (pKa experimentally determined to be 5.4), 2.5 to 10 wt % additive, and ink pH of 8 to 8.5 (unless noted). The print media comprised an experimental photopaper comprising a surface coating applied at pH 4. Such photopaper is essentially plain paper or some type of photobase provided with one or more coatings of silica to provide a glossy print medium. Such print media are used in color ink jet printing to provide the-equivalent of photographic prints. Silica coatings on print media are disclosed elsewhere; see, e.g., U.S. Pat. Nos. 5,275,867; 5,463,178; 5,576,088; 5,605,750; 5,989,378; and 6,187,430, the contents of which are incorporated herein by reference. Typically, plain paper or the photobase (the substrate) or a lower layer is coated with a proprietary mixture of silica or alumina, binder, such as poly(vinyl alcohol), and other components.

TABLE I

Relationship of Additive pKa and Ink pH to Bronzing

| Additive | Acid Aqueous pKa | Bronzing? |
|---|---|---|
| Octanoic acid | 4.9 | no |
| Triethanolamine | 7.77 | no |
| Tris(hydroxymethyl)aminomethane (TRIS) | 8.08 | no |
| 3-(N-Morpholino)propanesulfonic acid (MOPS) | 7.2 | no |
| Na acetate | 4.76 | no |
| Na dihydrogen phosphate | 6.82 | no |
| Diethylene glycol | >10 | yes |
| Cyanoacetic acid | 2.46 | yes |
| Triethylamine | 8.88 | yes |
| Triethanolamine ink pH 7 | 7.77 | yes |
| Triethanolamine ink pH 8 | 7.77 | no |

Thus, based on the teachings herein, it is a simple matter of (1) determining the pH of the print media, (2) determining the pH of the ink (to ensure that it is above the pH of the print media), and (3) finding an additive having a pKa that is between the two values. Such a determination is not considered to be undue, since the pKa values of most commonly used additives are known and published, or can be determined by simple titration, and determining the pH of both the print media and the ink is easily done with a pH meter. If the pKa of the dye is found to be an added factor, it, too, is readily determined, as discussed above.

The embodiments herein involve the addition of one or more so-called "anti-bronzing compounds" having a pKa above the pH of the print media and lower than the pH of the ink. The ink must also be at a pH above the highest applicable pKa of the dye.

The following classes of compounds, and examples thereof, are provided as being suitably employed in the practice of the embodiments taught herein: (1) amines with a pKa in the range 4 to 10, such as alkylamines, ammonia (in equilibrium with ammonium hydroxide), ethanolamine derivatives, pyridine derivatives, amino acids; (2) carboxylic acids with a pKa in the range 4 to 10, such as mono- and polycarboxylic acids having 20 carbons or less, such as acetic, adipic and succinic acids; (3) buffers (organic and inorganic) with a pKa in the range 4 to 10, such as Trizma ((tris)hydroxymethylaminomethane), MOPS (4-morpholinopro-panesulfonic acid), MES (4-morpholinoethanesulfonic acid), sodium acetate, sodium bicarbonate, and sodium dihydrogen phosphate, and (4) phosphonates and organic phosphates, such as 1-hydroxyethylene-1,1-diphosphonic acid. The compound 1-hydroxyethylene-1,1-diphosphonic acid is available as DEQUEST 2016 from Solutia, Inc. (St. Louis, Mo.).

The additive compound(s) is(are) included in the ink at a concentration within the range of about 0.75 to 30 wt %, based on the total ink composition. The concentration range is dependent on the dye and the pH of the print media, so under some conditions, the minimum concentration may be higher than listed here. Again, simple experimentation for a given dye and print media will determine the appropriate concentration range for that set of conditions. Below the minimum concentration, the anti-bronzing additive will have no effect on bronzing. While a higher concentration than 30 wt % may be tolerated, other factors may come into play, such as difficulty of jetting an ink having that elevated concentration of anti-bronzing additive. Preferably, the concentration of the anti-bronzing additive is in the range of about 0.75 to 15 wt %.

It is noted that many of the foregoing compounds, or additives, termed herein as "anti-bronzing compounds" or "anti-bronzing additives" are, in fact, compounds that have been commonly used in ink-jet printing formulations in the past. However, bronzing on plain papers, such as Hewlett-Packard Bright White, Hewlett-Packard Printing Paper, and Georgia-Pacific Multi-System, has typically not been a problem requiring the presence of anti-bronzing agents in the ink formulation. On the other hand, the present applicants have observed bronzing on print media having an alumina-based or silica-based coating as the ink-receiving layer (see discussion on bronzing and plain paper above). Such bronzing is substantially eliminated on such coated print media by employing the anti-bronzing agents disclosed and claimed herein.

The balance of the ink (vehicle and one or more dyes) employs conventional co-solvents (organic and water) and at least one dye in the conventional ranges disclosed elsewhere; see, e.g., U.S. Pat. No. 6,177,485, the contents of which are incorporated herein by reference, for a list of suitable co-solvents and dyes and concentration ranges thereof for ink-jet inks. It will be appreciated that not all dyes result in bronzing on the coated print media discussed herein. However, where any such dye used in ink-jet printing is found to bronze, the present teachings provide an approach to eliminating such bronzing.

Examples of other dyes benefiting from the teachings herein include, but are not limited to, Direct Blue 199 (CI 74180) and Black 287 (see U.S. Pat. No. 5,062,893, Dye II).

INDUSTRIAL APPLICABILITY

The anti-bronzing compounds disclosed and claimed herein as additives are expected to find use in reducing, or even eliminating, bronzing of inkjet inks on specialty print media.

What is claimed is:

1. An inklet ink for printing through an inkjet printer onto a print media having an ink-receiving layer thereon that includes an alumina-based or a silica-based coating, said print media having a first pH, said inkjet ink having a second pH and comprising a vehicle and a colorant, said vehicle comprising at least one co-solvent and said colorant comprising at least one dye, said inkjet ink further containing at least one anti-bronzing additive having a pKa that is above said first pH of said print media and less than said second pH of said ink, said anti-bronzing additive being present in an effective concentration to at least reduce bronzing of said dye on said print media.

2. The inkjet ink of claim 1 wherein said anti-bronzing additive has a pKa within a range of 4 to 10 and is selected from the group consisting of amines, carboxylic acids, phosphates, phosphonates, organic buffers, and inorganic buffers.

3. The inkjet ink of claim 2 wherein said amines are selected from the group consisting of alkylamines, ammonia, ethanolamine derivatives, pyridine derivatives, amino acids, wherein said carboxylic acids are mono- and polycarboxylic acids having 20 carbons or less, wherein said organic buffer is selected from the group consisting of (tris)hydroxymethylaminomethane, 4-morpholinopropanesulfonic acid, 4-morpholinoethanesulfonic acid, and sodium acetate, wherein said inorganic buffer is selected from the group consisting of sodium bicarbonate and sodium dihydrogen phosphate, and wherein said organic phosphonate comprises 1-hydroxyethylene-1,1-diphosphonic acid.

4. The inkjet ink of claim 1 wherein said anti-bronzing additive has a concentration in said inkjet ink within a range of about 0.75 to 30 wt %, based on the total ink composition.

5. The inkjet ink of claim 4 wherein said concentration is within a range of about 0.75 to 15 wt %.

6. The inkjet ink of claim 1 wherein said pKa of said bronzing additive is at least 0.5 unit above said pH of said print media.

7. The inkjet ink of claim 1 wherein said colorant has at least one experimentally determined applicable pKa and wherein said pKa of said anti-bronzing additive has a minimum value that is 1 unit below said experimentally determined applicable pKa of said colorant.

8. A method of reducing bronzing in an inkjet ink for printing through an inkjet printer onto a print media having an ink-receiving layer thereon that includes an alumina-based or a silica-based coating, said print media having a first pH, said inkjet ink having a second pH and comprising a vehicle and a colorant, said vehicle comprising at least one co-solvent and said colorant comprising at least one dye, said method comprising adding to said inkjet ink an amount of at least one anti-bronzing additive having a pKa that is above said first pH of said print media and less than said second pH of said ink, said amount being sufficient to at least reduce bronzing of said dye on said print media.

9. The method of claim 8 wherein said anti-bronzing additive has a pKa within a range of 4 to 10 and is selected from the group consisting of amines, carboxylic acids, organic buffers, and inorganic buffers.

10. The method of claim 9 wherein said amines are selected from the group consisting of alkylamines, ammonia, ethanolamine derivatives, pyridine derivatives, amino acids, wherein said carboxylic acids are mono- and polycarboxylic acids having 20 carbons or less, wherein said organic buffer is selected from the group consisting of (tris)hydroxymethylaminomethane, 4-morpholinopropanesulfonic acid, 4-morpholinoethanesulfonic acid, and sodium acetate, wherein said inorganic buffer is selected from the group consisting of sodium bicarbonate and sodium dihydrogen phosphate, and wherein said organic phosphonate comprises 1-hydroxyethylene-1,1-diphosphonic acid.

11. The method of claim 8 wherein said anti-bronzing additive is added to a concentration in said inkjet ink within a range of about 0.75 to 30 wt %, based on the total ink composition.

12. The method of claim 11 wherein said concentration is within a range of about 0.75 to 15 wt %.

13. The method of claim 8 wherein said pKa of said bronzing additive is at least 0.5 units above said pH of said print media.

14. The method of claim 8 wherein said colorant has at least one experimentally determined applicable pKa and wherein said pKa of said anti-bronzing additive has a minimum value that is 1 unit below said experimentally determined applicable pKa of said colorant.

15. A combination of a print media and an inkjet ink composition, wherein said print-media has an ink-receiving layer thereon that includes an alumina-based or a silica-based coating and has a first pH and wherein said inkjet ink composition is intended for printing from an inklet printer onto said print media, has a second pH, and comprises a vehicle and a colorant, said vehicle comprising at least one co-solvent and said colorant comprising at least one dye, said inkjet ink further containing at least one anti-bronzing additive having a pKa that is above said first pH of said print media and less than said second pH of said ink, said anti-bronzing additive having an effective concentration to at least reduce bronzing of said dye on said print media.

16. The combination of claim 15 wherein said anti-bronzing additive has a pKa within a range of 4 to 10 and is selected from the group consisting of amines, carboxylic acids, organic buffers, and inorganic buffers.

17. The combination of claim 16 wherein said amines are selected from the group consisting of alkylamines, ammonia, ethanolamine derivatives, pyridine derivatives, amino acids, wherein said carboxylic acids are mono- and polycarboxylic acids having 20 carbons or less, wherein said organic buffer is selected from the group consisting of (tris)-hydroxymethylaminomethane, 4-morpholinopropanesulfonic acid, 4-morpholinoethanesulfonic acid, and sodium acetate, wherein said inorganic buffer is selected from the group consisting of sodium bicarbonate and sodium dihydrogen phosphate, and wherein said organic phosphonate comprises 1-hydroxyethylene-1,1-diphosphonic acid.

18. The combination of claim 15 wherein said anti-bronzing additive has a concentration in said inkjet ink within a range of about 0.75 to 30 wt %, based on the total ink composition.

19. The combination of claim 18 wherein said concentration is within a range of about 0.75 to 15 wt %.

20. The combination of claim 15 wherein said pKa of said bronzing additive is at least 0.5 units above said pH of said print media.

21. The combination of claim 15 wherein said colorant has at least one experimentally determined applicable pKa and wherein said pKa of said anti-bronzing additive has a minimum value that is 1 unit below said experimentally determined applicable pKa of said colorant.

* * * * *

UNITED STATES PATENT AND TRADEMARK OFFICE
CERTIFICATE OF CORRECTION

| | |
|---|---|
| PATENT NO. | : 7,052,535 B2 |
| APPLICATION NO. | : 10/628903 |
| DATED | : May 30, 2006 |
| INVENTOR(S) | : Uhlir-Tsang et al. |

It is certified that error appears in the above-identified patent and that said Letters Patent is hereby corrected as shown below:

In the Claims

Col. 4 Claim 1 (line 47), delete "inklet" and insert therefor --inkjet--.

Signed and Sealed this

Ninth Day of January, 2007

JON W. DUDAS
*Director of the United States Patent and Trademark Office*